US006738481B2

(12) United States Patent
Krasny et al.

(10) Patent No.: US 6,738,481 B2
(45) Date of Patent: May 18, 2004

(54) NOISE REDUCTION APPARATUS AND METHOD

(75) Inventors: Leonid Krasny, Cary, NC (US); Ali S. Khayrallah, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 553 days.

(21) Appl. No.: 09/757,962

(22) Filed: Jan. 10, 2001

(65) Prior Publication Data

US 2002/0126856 A1 Sep. 12, 2002

(51) Int. Cl.[7] ................................................ H04B 15/00

(52) U.S. Cl. ..................... 381/94.1; 381/92; 381/71.12; 379/406.1; 379/406.12

(58) Field of Search ........................... 381/92, 94.1, 66, 381/71.8–71.12; 379/406.1–406.16

(56) References Cited

U.S. PATENT DOCUMENTS

| | | | | |
|---|---|---|---|---|
| 4,536,887 A | | 8/1985 | Kaneda et al. | |
| 4,641,259 A | | 2/1987 | Shan et al. | |
| 4,956,867 A | | 9/1990 | Zurek et al. | |
| 5,577,127 A | | 11/1996 | Van Overbeek | |
| 5,715,319 A | * | 2/1998 | Chu | 381/92 |
| 5,812,682 A | | 9/1998 | Ross et al. | |

FOREIGN PATENT DOCUMENTS

| | | |
|---|---|---|
| DE | 3929481 | 3/1980 |

OTHER PUBLICATIONS

Omologo M et al: "Environmental conditions and acoustic transduction in hands–free speech recognition" Speech Communication, Amsterdam, NL, vol. 25, No. 1–3, Aug. 1, 1998, pp. 75–95, XP004148066 ISSN: 0167–6393.

Fischer S et al: "Beamforming microphone arrays for speech acquisition in noisy environments" Speech Communication, Elsevier Science Publishers, Amsterdam, NL, vol. 20, No. 3, Dec. 1, 1996, pp. 215–227, XP004016546 ISSN: 0167–6393.

Le Bouquin R: "Enhancement of noisy speech signals: Application to mobile radio communications" Speech Communication, Elsevier Science Publishers, Amsterdam, NL, vol. 18, No. 1, 1996, pp. 3–19, XP004008920 ISSN: 0167–6393.

Asano F et al: "Speech enhancement using CSS–based array processing" 1997 IEEE International Conference on Acoustics, Speech, and Signal Processing. Speech Processing. Munich, Apr. 21–24, 1997, IEEE International Conference on Acoustics, Speech, and Signal Processing, Los Alamitos, IEEE Comp. Soc. Press, US, vol. 2, Apr. 21, 1997, pp. 1191–1194, XP000822666 ISBN: 0–8186–7920–4.

* cited by examiner

*Primary Examiner*—Melur Ramakrishnaiah
(74) *Attorney, Agent, or Firm*—Coats & Bennett, P.L.L.C.

(57) ABSTRACT

A method and noise reduction apparatus comprises a microphone array including a plurality of microphone elements for receiving a training signal including a plurality of training signal samples, and a working signal including a plurality of working signal samples, and at least one frequency domain convertor coupled to the plurality of microphone elements for converting the plurality of training signal samples and the plurality of working signal samples to the frequency domain. A signal spatial correlation matrix estimator is coupled to the at least one frequency domain convertor for estimating a signal spatial correlation matrix using the converted plurality of training signal samples. An inverse noise spatial correlation matrix estimator is coupled to the at least one frequency domain convertor for estimating an inverse noise spatial correlation matrix using the converted plurality of working signal samples. A constrained output generator is coupled to the at least one frequency domain convertor, the signal spatial correlation matrix estimator and the inverse noise spatial correlation matrix estimator for generating a constrained output for the noise reduction apparatus using the converted working signal samples, the estimated signal spatial correlation matrix and the estimated inverse noise spatial correlation matrix.

19 Claims, 3 Drawing Sheets

NOISE REDUCTION APPARATUS AND METHOD

BACKGROUND OF THE INVENTION

This invention is directed to noise reduction, and more particularly, to an apparatus and method for performing noise reduction for a signal received at a microphone array.

A noise reduction apparatus is typically used in conjunction with hands-free mobile terminals (for example, cellular telephones) and speaker phones, or with speech recognition systems, to reduce noise received at a microphone array of the noise reduction apparatus.

The general structure of different array processing algorithms for noise reduction apparatuses utilizing microphone arrays in conjunction with signal processing can be expressed in the frequency domain as $$U^{out}(\omega)=\sum_{i=1}^{N}U(\omega,r_i)\cdot H^*(\omega,r_i)$$

where $U^{out}(\omega)$ and $U(\omega, r_1)$ are respectively the Fourier transform of the microphone output and the field $u(t, r_i)$ observed at the i-th microphone elements with the spatial coordinates $r_i$, $H(\omega, r_1)$ is the frequency response of the filter at the i-th element of the microphone array, and N is the number of microphone array elements.

The determination of the functions $H(\omega, r_1)$ is the major area of concern in array processing. In conventional array processing, the optimization criteria used for the determination of the functions $H(\omega, r_i)$ are based on an assumption that the signal field in a limited space, for example an automobile cabin, has a coherent structure. This assumption leads to the following conventional algorithm for the determination of the weighting functions $H(\omega, r_1)$:

$$H(\omega,r_i)\equiv H_0(\omega,r_i)=\sum_{p=1}^{N}K_N^{-1}(\omega;r_i,r_p)G(\omega;r_p,r_0)$$

where $K_N^{-1}(\omega, r_1, r_p)$ denotes the elements of the matrix $K_N^{-1}(\omega)$ which is the inverse of the noise spatial correlation function matrix $K_N(\omega)$ with the elements $K_N(\omega; r_1, r_p)$. $G(\omega, r_p, r_0)$ is the Green function which describes the propagation channel between the talker with the spatial coordinates $r_0$ and the p-th array microphone. However, experimental data and theoretical analysis show that the coherent signal field model is unrealistic for many limited or confined spaces such as automobile environments where wall irregularities will scatter the signal waves propogating inside the automobile cabin.

SUMMARY OF THE INVENTION

A method of reducing noise and a noise reduction apparatus are provided utilizing a microphone array including a plurality of microphone elements for receiving a training signal including a plurality of training signal samples, and a working signal including a plurality of working signal samples. At least one frequency domain convertor is coupled to the plurality of microphone elements for converting the plurality of training signal samples and the plurality of working signal samples to the frequency domain. A signal spatial correlation matrix estimator is coupled to the at least one frequency domain convertor for estimating a signal spatial correlation matrix using the converted plurality of training signal samples, and an inverse noise spatial correlation matrix estimator is coupled to the at least one frequency domain convertor for estimating an inverse noise spatial correlation matrix using the converted plurality of working signal samples. A constrained output generator is coupled to the at least one frequency domain convertor, the signal spatial correlation matrix estimator and the inverse noise spatial correlation matrix estimator for generating a constrained output for the noise reduction apparatus using the converted working signal samples, the estimated signal spatial correlation matrix and the estimated inverse noise spatial correlation matrix.

The noise reduction apparatus may be used in conjunction with or implemented as part of a mobile terminal, a speakerphone, a speech recognition system, or any other device where noise reduction is desirable.

DETAILED DESCRIPTION OF THE INVENTION

Figure 1:
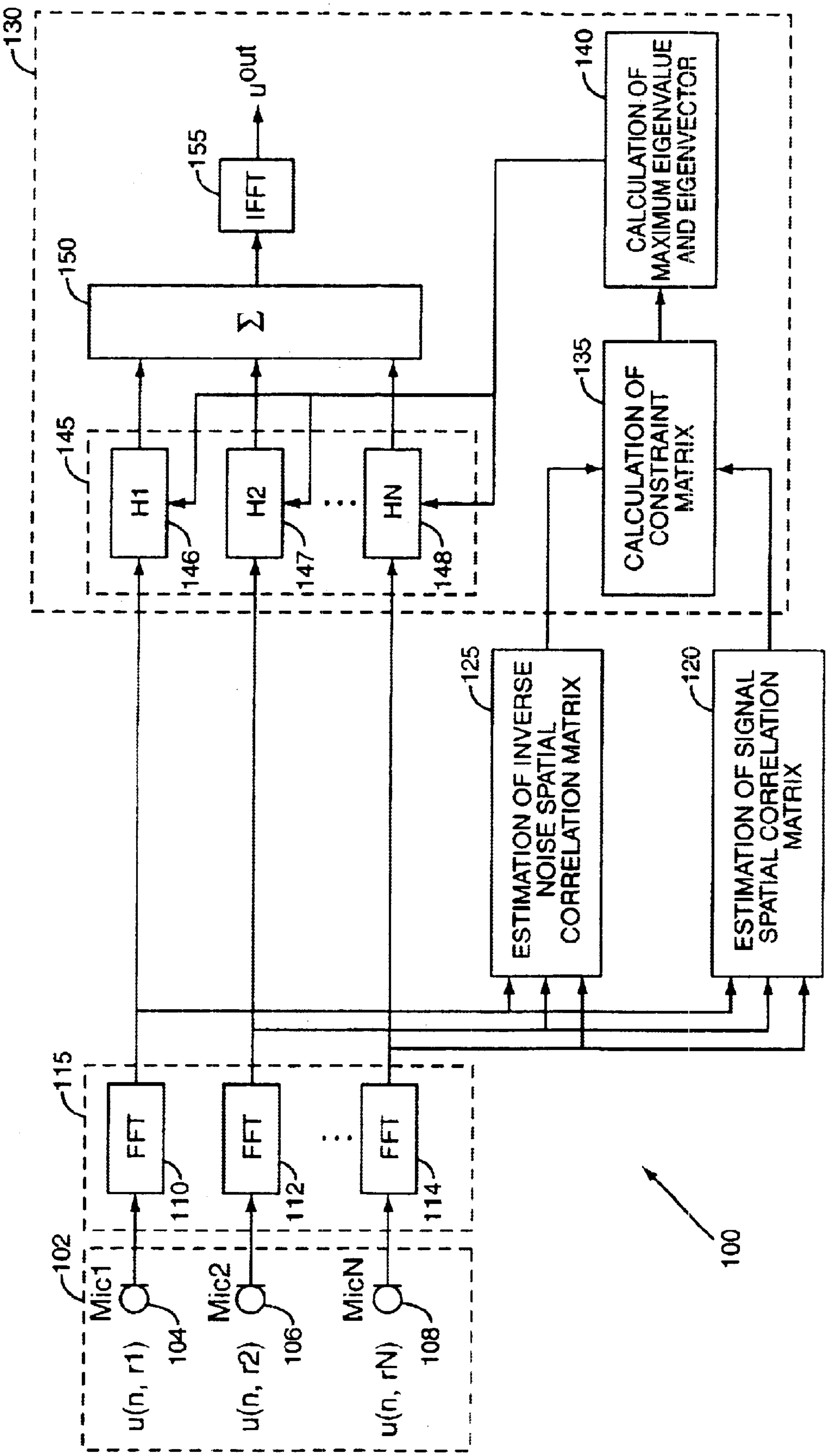
FIG. 1 is a block diagram in accordance with an embodiment of the invention.

To avoid the drawbacks of the conventional array processing technique, a new optimization criteria with constraint is not based on the assumption that the signal field in a limited space, for example an automobile cabin, has a coherent structure. The nature of the human auditory system is taken into account in the formulation of the optimization criteria, as significant degradation in the desired signal is unacceptable even if the noise level is greatly reduced. Thus, the optimization problem for the array processing algorithm $U^{out}(\omega)$ may be overcome by minimizing the output noise spectral density subject to an equality nonlinear constraint $$g_S^{out}(\omega)=g_S(\omega)|B(\omega)|^2$$

where $$g_S^{out}(\omega)=\sum_{i=1}^{N}\sum_{p=1}^{N}K_S(\omega;r_i,r_p)H^*(\omega,r_i)H(\omega,r_p)$$

is the signal spectral density after array processing, and $B(\omega)$ is the constraint function which takes into account the response characteristics of the human auditory system. The constraint function $B(\omega)$ may be tailored for greater noise constraint over specific parts of the audible frequency spectrum. For example, the constraint function $B(\omega)$ may be selectable to provide greater noise suppression over lower audible frequencies, providing people with hearing difficulties over such lower audible frequencies a clearer (and louder) audible signal from the cellular telephone speaker. The constraint $g_S^{out}$ represents the degree of degradation of the desired signal and permits the combination of various frequency bins at the space-time processing output with a priori desired distortion.

According to this optimization criteria, the weighting functions $H(\omega, r_1)$ are obtained as a solution of the variation problem $$H(\omega, r_i) = \arg\left\{\min\sum_{i=1}^{N}\sum_{p=1}^{N} K_N(\omega; r_i, r_p)H^*(\omega, r_i)H(\omega, r_p)\right\}$$

subject to the constraint $g_S^{out}$.

The solution of this optimization problem gives the following algorithm for the calculation of weighting functions:

$$H(\omega, r_i) = \frac{B(\omega)}{\sqrt{v_{\max}(\omega)}} E_{\max}(\omega, r_i)$$

where $E_{max}(\omega, r_1)$ are the elements of the eigenvector $E_{max}(\omega)$, which corresponds to the largest eigenvalue $v_{max}(\omega)$ of the constraint matrix $K=K_N^{-1}Ks$ having elements $$K(\omega; r_i, r_p) = \sum_{m=1}^{N} K_N^{-1}(\omega; r_i, r_m) K_S(\omega; r_m, r_p).$$

The constraint function $B(\omega)$ allows the nature of the human auditory system to be taken into account during calculation of the weighting functions.

The working scheme for the proposed array processing algorithm may be divided into two phases, a training phase and a working phase. The training phase provides an estimate of the signal spatial correlation function $K_S(\omega; r_1, r_p)$ which is used in the working phase, along with other values, to generate a constrained output for a noise reduction apparatus. A block diagram of a noise reduction apparatus in accordance with an embodiment of the invention is shown in FIG. 1.

FIG. 1 shows a noise reduction apparatus 100 comprising a microphone array 102 for selectively receiving either a training signal or a working signal and includes a plurality N of microphone elements, for example microphone elements 104, 106 and 108. Each microphone element 104, 106 and 108 of the microphone array 102 is coupled to a corresponding frequency domain convertor 110, 112 and 114 respectively of frequency domain convertors 115, the frequency domain convertors 115 for converting the training signal and the working signal to the frequency domain. The frequency domain convertors 115 are coupled to both a signal spatial correlation matrix estimator 120 and an inverse noise spatial correlation matrix estimator 125. The signal spatial correlation matrix estimator 120 provides an estimate of a signal spatial correlation matrix for the training signal (further discussed below). The inverse noise spatial correlation matrix estimator 125 provides an estimate of the inverse noise spatial correlation matrix using the working signal (further discussed below). The frequency domain convertors 115, the signal spatial correlation matrix estimator 120 and the inverse noise spatial correlation matrix estimator 125 are further coupled to a constrained output generator 130.

The constrained output generator includes a first calculator 135 coupled to the signal spatial correlation matrix estimator 120 and the inverse noise spatial correlation matrix estimator 125 for calculating a constraint matrix. The first calculator 135 is coupled to a second calculator 140 which calculates a maximum eigenvalue and a maximum eigenvector of the constraint matrix. The second calculator 140 and the frequence domain convertors 115 are coupled to frequency response filters 145, which calculate a frequency response of the microphone elements 104, 106 and 108. Each of the frequency domain convertors 110, 112 and 114 is coupled to frequency response filters 146, 147 and 148 respectively. The frequency response filters 145 are coupled to a summing device 150 which generates the constrained output for the noise reduction apparatus 100 using the frequency response of each of the plurality N microphone elements of the microphone array 102. A time domain convertor 155 is coupled to the constrained output generator 130 for converting the constrained output from the frequency domain to the time domain. Specifically, the time domain convertor 155 is coupled to the summing device 150.

In order to estimate the signal spatial correlation function $K_S(\omega; r_1, r_p)$ at the aperture of the microphone array 102, training sequences are recorded through the actual system in the limited or confined space, for example, the automobile environment with all its imperfections. They are recorded during a training phase where little or no ambient automobile noise is present. The training can be done on site in a parked automobile by using the existing hands-free loud speaker in what would be a human speaker's position. The estimate of the signal spatial correlation function then is stored in a memory (not shown) for later use during the working phase. Operation of the noise reduction apparatus 100 of FIG. 1 will be discussed with respect to the flowcharts of FIGS. 2 and 3.

Figure 2:
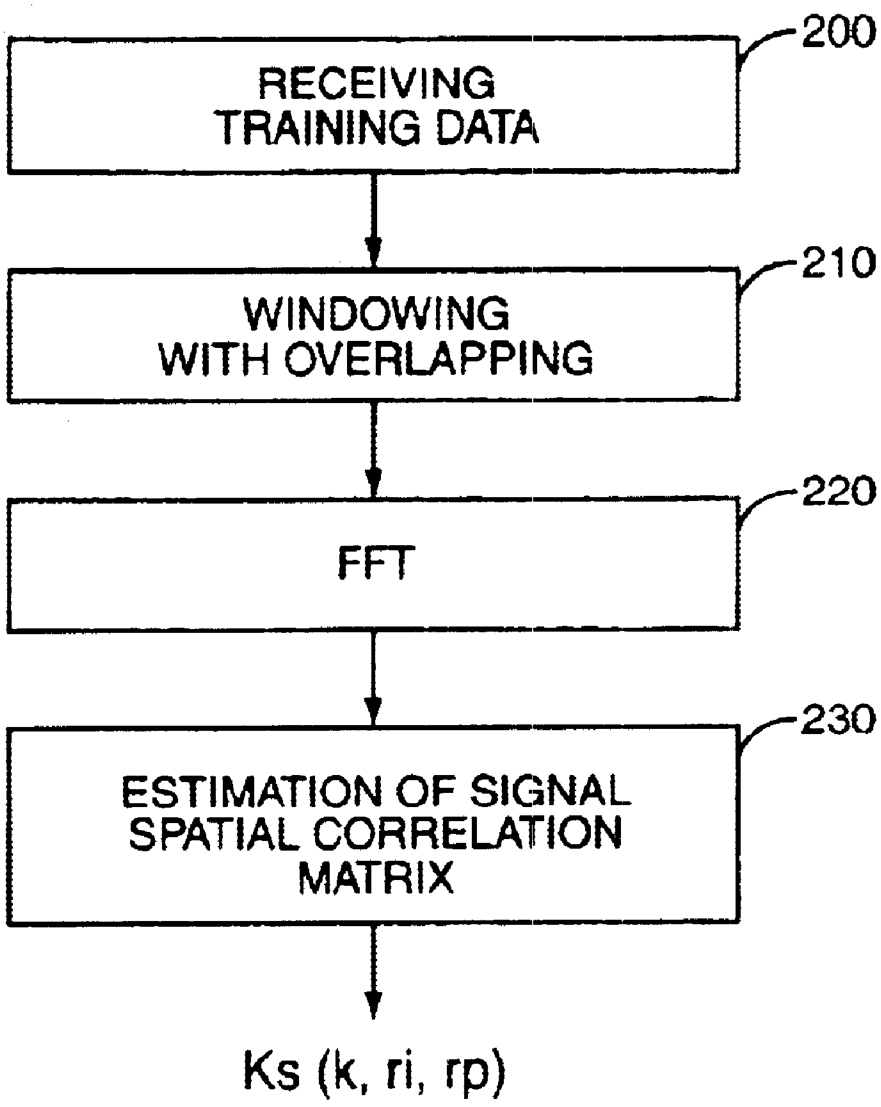
FIG. 2 is a flowchart illustrating the training phase in accordance with the embodiment of FIG. 1.

FIG. 2 is a flowchart illustrating the training phase. In step 200, sampled training sequences are received as a plurality of training signal samples $$\{s(n, r_1), \ldots, s(n, r_i), \ldots, s(n, r_N)\},$$

which are recorded at the output of the microphone array 102 in the limited space, for example the automobile cabin, when little or no ambient noise is present. Here, $s(n, r_1)$ denotes the n-th sample of the training signal which is recorded at the output of the i-th microphone element with spatial coordinates $r_i$.

Once the training signal is received, it is converted to the frequency domain by the plurality of frequency domain converters 115 using, for example, a Fast Fourier Transform (FFT) algorithm. The frequency domain converting technique is running on a frame-block basis. In hands-free mobile telephones each frame contains $N_1=160$ samples. To improve the representation of the spectrum, the FFT length is effectively increased by overlapping and windowing, step 210. Where the FFT with $N_0=256$ points (samples), the $N_1$ samples of the q-th frame are overlapped with the last $(N_0-N_1)$ samples of the previous (q−1 )th frame. As a result, the q-th frame at the i-th microphone element contains training signal $$s_q(n, r_1) \equiv s(q \cdot N_1 - N_0 + n, r_1),$$

where $n\epsilon[0, N_0-1]$ and $i\epsilon[1, N]$.

The signals $s_q(n, r_1)$ are windowed using the smoothed Hanning window $$w(n) = \begin{cases} \sin^2(\pi n/(N_0 - N_1)) \\ 1 \\ \sin^2(\pi(n - N_0 + 1)/(N_0 - N_1)) \end{cases}$$

$$\text{if } n \in [0, (N_0 - N_1)/2 - 1]$$
$$\text{if } n \in [(N_0 - N_1)/2, (N_0 + N_1)/2 - 1]$$
$$\text{if } n \in [(N_0 + N_1)/2, (N_0 - 1)]$$

Using the windowed, overlapped training signal samples, the FFT is calculated For $K\epsilon[0, N_0-1]$ and $i\epsilon[1, N]$ in step 220 as $$S_q(k, r_i) = \sum_{n=0}^{N_0-1} w(n)\cdot s_q(n, r_i)\cdot \exp(-j2\pi kn/N_0).$$

After the training signal samples are converted to the frequency domain, the signal spatial correlation matrix is estimated at the signal spatial correlation matrix estimator 120, step 230, for K∈[0, $N_0/2$] and i∈[1, N], and p∈[i, N] as $$\hat{K}_{Sq}(k, r_1, r_p)=m\cdot\hat{K}_{S(q-1)}(k, r_1, r_p)+(1-m)\cdot S_q(k, r_1)\cdot S_q^*(k, r_p)$$

where m is a convergence factor (for example, m∈[0.9, 0.95]). $\hat{K}_{Sq}(k, r_1, r_p)$ denotes an estimate of the signal spatial correlation matrix at the q-th frame. Initially, $\hat{K}_{S(q-1)}(k, r_i, r_p)$ may be set to zero. To minimize the calculations, it may be taken into account that $$\hat{K}_{Sq}(k, r_1, r_p)=[\hat{K}_{Sq}(k, r_p, r_i)]^*.$$

After processing of the Q frames, the signal spatial correlation matrix is estimated as $$\hat{K}_S(k, r_1, r_p)=\hat{K}_{SQ}(k, r_i, r_p).$$

Figure 3:
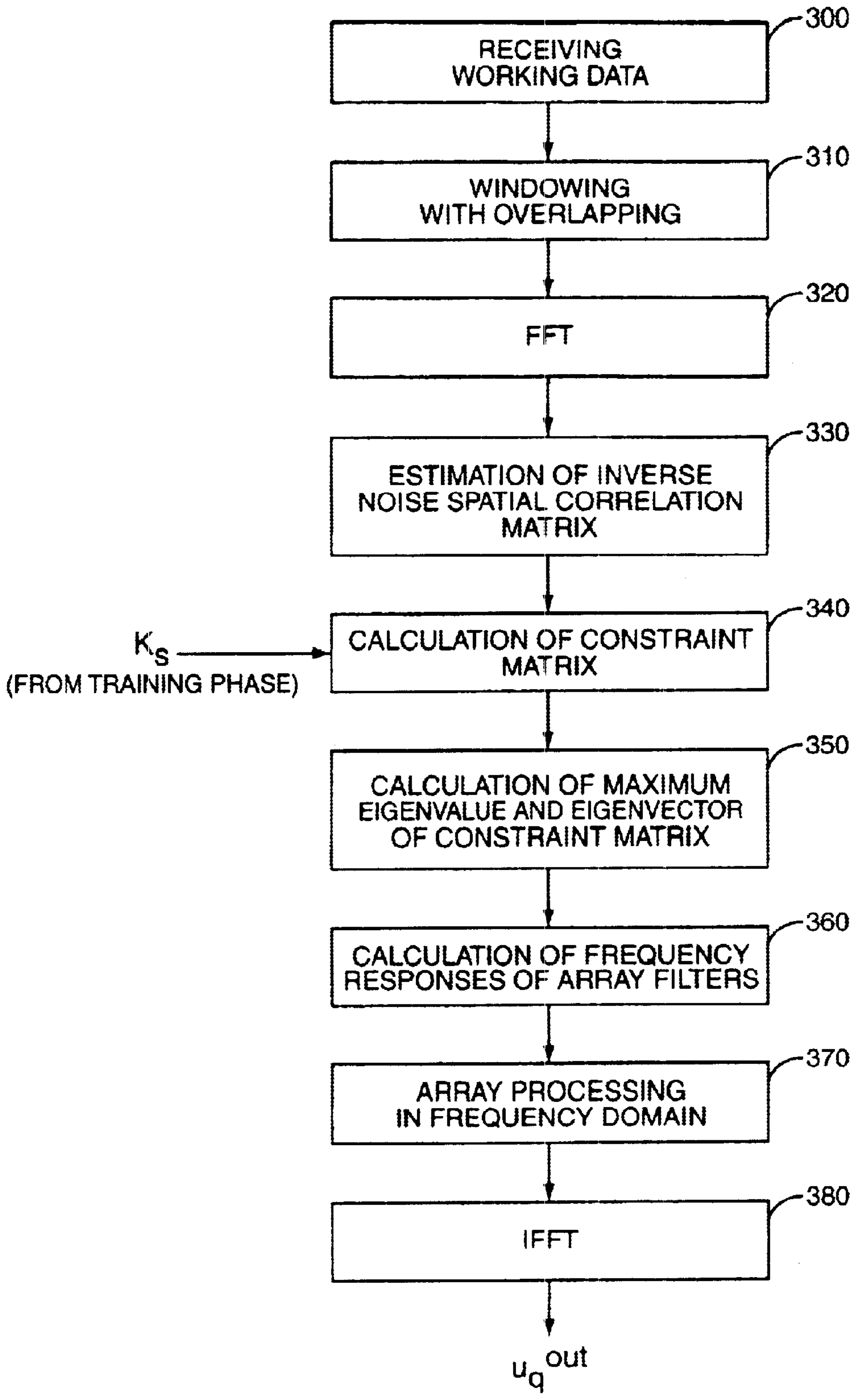
FIG. 3 is a flowchart illustrating the working phase in accordance with the embodiment of FIG. 1.

The working phase is illustrated in FIG. 3. In step 300, sampled working sequences are received as a plurality of working signal samples $$\{u(n, r_1), \ldots, u(n, r_1), \ldots, u(n, r_N)\},$$

which are observed at the microphone elements of the microphone array 102. For example u(n, $r_1$) is the output signal of the i-th microphone element with the spatial coordinates $r_1$. The working sequences are received under normal operating conditions, and thus ambient noise need not be limited.

The working signal samples $u_q(n, r_1)$ are windowed and overlapped, step 310, in a similar fashion as for the training phase, described above with respect to step 210 of FIG. 2. For example, the q-th frame at the i-th microphone element contains the signal $$u_q(n, r_i)=u(q\cdot N_1-N_0+n, r_1),$$

where n∈[0, $N_0-1$] and i∈[1, N].

Using the windowed, overlapped training signal samples, the FFT is calculated by the plurality of frequency domain convertors 115 for k∈[0, $N_0-1$] and i∈[1, N] in step 320 in a similar fashion as in the training phase discussed above with reference to step 220 of FIG. 2, where $$U_q(k, r_i) = \sum_{n=0}^{N_0-1} w(n)\cdot u_q(n, r_i)\cdot \exp(-j2\pi kn/N_0).$$

After the working signal has been converted to the frequency domain, the inverse noise spatial correlation matrix estimator 125 estimates the inverse noise spatial correlation matrix $K_N^{-1}(\omega; r_1, r_p)$ using the Recursive Least Square (RLS) algorithm, which has been modified for processing in the frequency domain, step 330. This algorithm allows direct calculation of the matrix $K_N^{-1}(\omega; r_1, r_p)$. For k∈[0, $N_0/2$], i∈[1, N], and p∈[i, N], the inverse noise spatial correlation function is estimated as $$\hat{K}_{Nq}^{-1}(k, r_i, r_p) = \frac{1}{m}\cdot\left\{\hat{K}_{N(q-1)}^{-1}(k, r_i, r_p) - \frac{D_q(k, r_i)\cdot D_q^*(k, r_p)}{m+\sum_{i=1}^{N} D_q(k, r_i)\cdot U_q^*(k, r_i)}\right\}$$

where $K_{Nq}^{-1}(k, r_1, r_p)$ denotes an estimate of the inverse noise spatial correlation matrix at the q-th frame.

The initial matrix for the inverse spatial correlation matrix algorithm can be chosen as $$\hat{K}_{N0}^{-1}(k; r_i, r_p) = a\cdot\delta_{ip}$$

where a is a large constant, and $\delta_{1p}$ is the Kronecker symbol. The functions $D_q(k, r_p)$ are calculated using the inverse noise correlation matrix at the previous (q−1)th frame as $$D_q(k, r_p) = \sum_{i=1}^{N} \hat{K}_{N(q-1)}^{-1}(k, r_p, r_i)\cdot U_q(k, r_i).$$

After the inverse noise spatial correlation matrix is estimated in step 330, the constraint matrix is calculated by the first calculator 135, step 340, using the signal spatial correlation matrix as, for example as calculated in step 230, and the inverse noise spatial correlation matrix. For k∈[0, $N_0/2$], i∈[1, N], and p∈[i, N], the constraint matrix is calculated as $$\hat{K}_q(k, r_i, r_p) = \sum_{m=1}^{N} \hat{K}_{Nq}^{-1}(k; r_i, r_m)\hat{K}_S(k; r_m, r_p).$$

In step 350, a maximum eigenvalue $v_{max}(k)$ and a corresponding eigen vector $E_{max}(k, r_1)$ of the constraint matrix $\hat{K}_q(k, r_l, r_p)$ is calculated by the second calculator 140 for k∈[0, $N_0/2$], i∈[1, N], and p∈[i, N]. Calculations may be done using standard matrix computations, similar to that as discussed above with respect to calculation of the constraint matrix $\hat{K}_q-\hat{K}_{Nq}^{-1}\hat{K}K_s$.

After calculating the maximum eigenvalue $v_{max}(k)$ and the corresponding eigen vector $E_{max}(k, r_1)$, the frequency response for the microphone elements 104, 106 and 108 of the microphone array 102 are calculated by the plurality of frequency response filters 145 for k∈[0, $N_0/2$], and i∈[1, N], step 360, as $$H_q(k, r_i) = \frac{B(k)}{\sqrt{v_{\max}(k)}} E_{\max}(k, r_i).$$

B(k) accounts for the nature of the human auditory system.

In step 370, the constrained output is generated at the summing device 150 for k∈[0, $N_0/2$] as $$U_q^{out}(k) = \sum_{i=1}^{N} U_q(k, r_i)H_q^*(k, r_i)$$

and for k∈[$N_0/2+1$, $N_0-1$] as $$U_q^{out}(k)=[U_q^{out}(N_0-k)]^*.$$

The constrained output is then converted to the time domain by time domain convertor 155 in step 380 for n∈[0, $N_0-1$], by calculating an inverse FFT as $$u_q^{out}(n) = \sum_{k=0}^{N_0-1} \cdot U_q^{out}(k)\exp(j2\pi kn/N_0).$$

It would be apparent to one skilled in the art that the noise reduction apparatus may be implemented as discrete components, or as a program operating on a suitable processor. Additionally, the number of microphone elements of the microphone array is not crucial in attaining the advantages of the noise reduction apparatus of the invention. Further, the noise reduction apparatus may be implemented as part of a mobile terminal operating in a communications system utilizing, for example, Code Division Multiple Access or Time Division Multiple Access architecture. The noise reduction apparatus may also be implemented as part of a speaker phone, a speech recognition system or any device where noise reduction is desired. Alternatively, the noise reduction apparatus may be utilized in conjunction with a mobile terminal, speaker phone, speech recognition system or any device where noise reduction is desired. Additionally, although the invention has been described in the context of the limited or confined space being an automobile cabin, the advantages attained would be applicable for any space such as a conference room or other confined or limited area.

Still other aspects, objects and advantages of the invention can be obtained from a study of the specification, the drawings, and the appended claims. It should be understood, however, that the invention could be used in alternate forms where less than all of the advantages of the present invention and preferred embodiments as described above would be obtained.

We claim:

1. A method for training a noise reduction apparatus having a microphone array comprising a plurality of microphone elements, comprising:

receiving a training signal comprising a plurality of signal samples from the plurality of microphone elements of the microphone array;

converting the plurality of signal samples to the frequency domain;

estimating a signal spatial correlation matrix using the converted plurality of signal samples: and wherein the training signal is received over a plurality of time frames and estimating a signal spatial correlation matrix using the converted plurality of signal samples comprises using estimated values of the signal spatial correlation matrix from a previous time frame, converted signal samples corresponding to a first microphone element of the microphone array, and converted signal samples corresponding to a second microphone element of the microphone array.

2. The method of claim 1 wherein estimating a signal spatial correlation matrix using estimated values of the signal spatial correlation matrix from a previous time frame, converted signal samples corresponding to the first microphone element of the microphone array, and converted signal samples corresponding to the second microphone element of the microphone array further comprises using a convergence factor.

3. The method of claim 1 wherein the time frame is a Time Division Multiple Access (TDMA) time frame.

4. A method for training a noise reduction apparatus having a microphone array comprising a plurality of microphone elements, comprising:

receiving a training signal comprising a plurality of signal samples from the plurality of microphone elements of the microphone array;

converting the plurality of signal samples to the frequency domain;

estimating a signal spatial correlation matrix using the converted plurality of signal samples; and wherein the training signal comprising the plurality of received signals is received over a plurality of time frames, and converting the plurality of signal samples of the training signal to the frequency domain further comprises converting the plurality of signal samples of the training signal to the frequency domain using overlapped signal samples from at least a previous time frame and a current time frame, and windowing the training signal from at least the previous time frame and the current time frame using a Hanning window.

5. A method of reducing noise using a noise reduction apparatus comprising:

receiving a working signal comprising a plurality of signal samples from a microphone array having a plurality of microphone elements;

converting the plurality of signal samples to the frequency domain;

estimating an inverse noise spatial correlation matrix using the converted plurality of signal samples; and processing the plurality of signal samples using the inverse spatial correlation matrix and an estimated signal spatial correlation matrix to generate a constrained output.

6. The method of claim 5 further comprising converting the constrained output to the time domain.

7. The method of claim 6 wherein converting the constrained output to the time domain comprises calculating an inverse Fast Fourier Transform of the constrained output.

8. The method of claim 5 wherein converting the plurality of signal samples to the frequency domain comprises processing the plurality of signal samples using a Fast Fourier Transform algorithm.

9. The method of claim 5 wherein processing the plurality of signal samples using the inverse spatial correlation matrix and the estimated signal spatial correlation matrix to generate the constrained output comprises:

calculating a constraint matrix using the inverse noise spatial correlation matrix and an estimated signal spatial correlation matrix;

calculating a maximum eigenvalue of the constraint matrix;

calculating a maximum eigenvector of the constraint matrix;

calculating a frequency response for each of the plurality of microphone elements using the maximum eigenvalue, the maximum eigenvector and a constraint function; and generating the constrained output using the calculated frequency response and the working signal comprising the plurality of signal samples.

10. The method of claim 9 wherein the constraint function is an auditory system constraint function used to account for the nature of the human auditory system.

11. A noise reduction apparatus comprising:

a microphone array comprising a plurality of microphone elements for receiving a training signal comprising a plurality of training signal samples, and a working signal comprising a plurality of working signal samples;

at least one frequency domain convertor coupled to the plurality of microphone elements for converting the plurality of training signal samples and the plurality of working signal samples to the frequency domain;

a signal spatial correlation matrix estimator coupled to the at least one frequency domain convertor for estimating a signal spatial correlation matrix using the converted plurality of training signal samples;

an inverse noise spatial correlation matrix estimator coupled to the at least one frequency domain convertor for estimating an inverse noise spatial correlation matrix using the converted plurality of working signal samples; and a constrained output generator coupled to the at least one frequency domain convertor, the signal spatial correlation matrix estimator and the inverse noise spatial correlation matrix estimator for generating a constrained output for the noise reduction apparatus using the converted working signal samples, the estimated signal spatial correlation matrix and the estimated inverse noise spatial correlation matrix.

12. The noise reduction apparatus of claim 11 further comprising a time domain converter coupled to the constrained output generator for converting the constrained output to the time domain.

13. The noise reduction apparatus of claim 11 wherein the constrained output generator comprises:

a first calculator coupled to the signal spatial correlation matrix estimator and the inverse noise spatial correlation matrix estimator for calculating a constraint matrix using the signal spatial correlation matrix and the inverse noise spatial correlation matrix;

a second calculator coupled to the first calculator for calculating a maximum eigenvalue and a maximum eigenvector of the constraint matrix;

at least one filter coupled to the at least one frequency domain convertor and the second calculator for calculating a frequency response of each of the plurality of microphone elements using the maximum eigenvalue, the maximum eigenvector and a constraint function; and a summing device coupled to the at least one filter for generating the constrained output using the frequency response of each of the plurality of microphone elements.

14. The noise reduction apparatus of claim 13 wherein the constraint function used by the at least one filter coupled to the at least one frequency domain converter and the second calculator is an auditory system constraint function.

15. The noise reduction apparatus of claim 11 wherein the at least one frequency domain convertor comprises an at least one Fast Fourier Transform calculator for converting the plurality of training signal samples and the plurality of working signal samples to the frequency domain using a Fast Fourier Transform algorithm.

16. The noise reduction apparatus of claim 11 wherein the noise reduction apparatus is used in conjunction with a mobile terminal.

17. The noise reduction apparatus of claim 11 wherein the noise reduction apparatus is used in conjunction with a speech recognition system.

18. A noise reduction apparatus for a hands-free mobile terminal, comprising:

a microphone array comprising a plurality of microphone elements for receiving a training signal comprising a plurality of training signal samples generated in a confined space where little ambient noise is present, and a working signal comprising a plurality of working signal samples generated within the confined space under normal operating conditions;

at least one frequency domain convertor coupled to the plurality of microphone elements for converting the plurality of training signal samples and the plurality of working signal samples to the frequency domain;

a signal spatial correlation matrix estimator coupled to the at least one frequency domain convertor for estimating a signal spatial correlation matrix using the converted plurality of training signal samples;

an inverse noise spatial correlation matrix estimator coupled to the at least one frequency domain convertor for estimating an inverse noise spatial correlation matrix using the converted plurality of working signal samples; and a constrained output generator coupled to the at least one frequency domain convertor, the signal spatial correlation matrix estimator and the inverse noise spatial correlation matrix estimator for generating a constrained output for the noise reduction apparatus using the converted working signal samples, the estimated signal spatial correlation matrix and the estimated inverse noise spatial correlation matrix.

19. A noise reduction apparatus for a speech recognition system comprising:

a microphone array comprising a plurality of microphone elements for receiving a training signal comprising a plurality of training signal samples generated in a limited space where little ambient noise is present, and a working signal comprising a plurality of working signal samples generated within the limited space under normal operating conditions;

at least one frequency domain convertor coupled to the plurality of microphone elements for converting the plurality of training signal samples and the plurality of working signal samples to the frequency domain;

a signal spatial correlation matrix estimator coupled to the at least one frequency domain convertor for estimating a signal spatial correlation matrix using the converted plurality of training signal samples;

an inverse noise spatial correlation matrix estimator coupled to the at least one frequency domain convertor for estimating an inverse noise spatial correlation matrix using the converted plurality of working signal samples; and a constrained output generator coupled to the at least one frequency domain convertor, the signal spatial correlation matrix estimator and the inverse noise spatial correlation matrix estimator for generating a constrained output for the noise reduction apparatus using the converted working signal samples, the estimated signal spatial correlation matrix and the estimated inverse noise spatial correlation matrix.

* * * * *